(12) United States Patent
Frid (10) Patent No.: US 8,775,704 B2
(45) Date of Patent: Jul. 8, 2014

(54) METHOD AND SYSTEM FOR COMMUNICATION BETWEEN A SECONDARY PROCESSOR AND AN AUXILIARY DISPLAY SUBSYSTEM OF A NOTEBOOK

(75) Inventor: Aleksandr Frid, San Francisco, CA (US)

(73) Assignee: Nvidia Corporation, Santa Clara, CA (US)

( * ) Notice: Subject to any disclaimer, the term of this patent is extended or adjusted under 35 U.S.C. 154(b) by 0 days.

(21) Appl. No.: 11/398,168

(22) Filed: Apr. 5, 2006

(65) Prior Publication Data

US 2007/0239920 A1 Oct. 11, 2007

(51) Int. Cl.
*G06F 13/00* (2006.01)
*G06F 1/32* (2006.01)
*G06F 13/38* (2006.01)

(52) U.S. Cl.
CPC ............... *G06F 13/00* (2013.01); *G06F 13/38* (2013.01); *G06F 1/32* (2013.01)
USPC ........... 710/100; 710/300; 710/303; 710/305; 713/323; 713/324

(58) Field of Classification Search
USPC ..................... 710/105, 11, 100, 69, 305–306; 713/300, 320; 709/206
See application file for complete search history.

(56) References Cited

U.S. PATENT DOCUMENTS

| | | | |
|---|---|---|---|
| 4,603,400 A * | 7/1986 | Daniels ............................ | 710/72 |
| 4,955,066 A | 9/1990 | Notenboom | |
| 5,321,510 A | 6/1994 | Childers et al. | |
| 5,371,847 A | 12/1994 | Hargrove | |
| 5,461,679 A | 10/1995 | Normile et al. | |
| 5,517,612 A | 5/1996 | Dwin et al. | |
| 5,572,649 A | 11/1996 | Elliott et al. | |
| 5,687,334 A | 11/1997 | Davis et al. | |
| 5,712,995 A | 1/1998 | Cohn | |
| 5,768,164 A * | 6/1998 | Hollon, Jr. ..................... | 708/174 |
| 5,781,199 A | 7/1998 | Oniki et al. | |
| 5,841,435 A | 11/1998 | Dauerer et al. | |
| 5,878,264 A | 3/1999 | Ebrahim | |

(Continued)

FOREIGN PATENT DOCUMENTS

WO 2005026918 3/2005

OTHER PUBLICATIONS

Andrew Fuller; "Auxiliary Display Platform in Longhorn"; Microsoft Corporation; The Microsoft Hardware Engineering Conference Apr. 25-27, 2005; slides 1-29.*

(Continued)

*Primary Examiner* — Ryan Stiglic (57) ABSTRACT

A method for communication over an SMB, I2C bus, or other serial bus between an auxiliary display subsystem and a secondary processor of a notebook including the auxiliary display subsystem, and systems, circuits and notebooks configured to perform the method. Typically, communication over the serial bus between the auxiliary display subsystem and secondary processor can occur when the notebook is in a standby or other low-power state (e.g., to obtain system status data or cause the notebook to wake up) or a fully-powered normal operating state. Typically, the auxiliary display subsystem is coupled not only to the notebook's secondary processor by the serial bus but also to the notebook's central processing unit by another link (e.g., a USB).

49 Claims, 2 Drawing Sheets

(56) References Cited

U.S. PATENT DOCUMENTS

| | | |
|---|---|---|
| 5,900,913 A | 5/1999 | Tults |
| 5,917,502 A | 6/1999 | Kirkland et al. |
| 5,923,307 A | 7/1999 | Hogle, IV |
| 5,953,532 A | 9/1999 | Lochbaum |
| 5,978,042 A | 11/1999 | Vaske et al. |
| 6,008,809 A | 12/1999 | Brooks |
| 6,018,340 A | 1/2000 | Butler et al. |
| 6,025,841 A | 2/2000 | Finkelstein et al. |
| 6,025,853 A | 2/2000 | Baldwin |
| 6,075,531 A | 6/2000 | DeStefano |
| 6,078,339 A | 6/2000 | Meinerth et al. |
| 6,191,758 B1 * | 2/2001 | Lee ................. 345/2.2 |
| 6,208,273 B1 | 3/2001 | Dye et al. |
| 6,226,237 B1 | 5/2001 | Chan et al. |
| 6,259,460 B1 | 7/2001 | Gossett et al. |
| 6,337,747 B1 | 1/2002 | Rosenthal |
| 6,359,624 B1 | 3/2002 | Kunimatsu |
| 6,388,671 B1 | 5/2002 | Yoshizawa et al. |
| 6,407,752 B1 | 6/2002 | Harnett |
| 6,473,086 B1 | 10/2002 | Morein et al. |
| 6,480,198 B2 | 11/2002 | Kang |
| 6,483,502 B2 | 11/2002 | Fujiwara |
| 6,483,515 B1 | 11/2002 | Hanko |
| 6,498,721 B1 | 12/2002 | Kim ................. 361/681 |
| 6,557,065 B1 | 4/2003 | Peleg et al. |
| 6,600,500 B1 | 7/2003 | Yamamoto |
| 6,628,243 B1 | 9/2003 | Lyons et al. |
| 6,628,309 B1 | 9/2003 | Dodson et al. |
| 6,630,943 B1 | 10/2003 | Nason et al. |
| 6,654,826 B1 | 11/2003 | Cho et al. ................. 710/62 |
| 6,657,632 B2 | 12/2003 | Emmot et al. |
| 6,724,403 B1 | 4/2004 | Santoro et al. |
| 6,753,878 B1 | 6/2004 | Heirich et al. |
| 6,774,912 B1 | 8/2004 | Ahmed et al. |
| 6,784,855 B2 | 8/2004 | Matthews et al. ............. 345/1.1 |
| 6,816,977 B2 * | 11/2004 | Brakmo et al. ................. 713/323 |
| 6,832,269 B2 | 12/2004 | Huang et al. |
| 6,832,355 B1 | 12/2004 | Duperrouzel et al. |
| 6,871,348 B1 | 3/2005 | Cooper |
| 6,956,542 B2 * | 10/2005 | Okuley et al. ................. 345/1.1 |
| 7,007,070 B1 | 2/2006 | Hickman |
| 7,010,755 B2 | 3/2006 | Anderson et al. |
| 7,030,837 B1 * | 4/2006 | Vong et al. ................. 345/1.3 |
| 7,036,089 B2 | 4/2006 | Bauer |
| 7,103,850 B1 | 9/2006 | Engstrom et al. |
| 7,124,360 B1 | 10/2006 | Drenttel et al. |
| 7,127,745 B1 | 10/2006 | Herse et al. |
| 7,129,909 B1 | 10/2006 | Dong et al. |
| 7,149,982 B1 | 12/2006 | Duperrouzel et al. |
| 7,269,797 B1 | 9/2007 | Bertocci et al. |
| 7,359,998 B2 | 4/2008 | Chan et al. |
| 7,486,279 B2 * | 2/2009 | Wong et al. ................. 345/173 |
| 7,509,444 B2 | 3/2009 | Chiu et al. |
| 7,546,546 B2 | 6/2009 | Lewis-Bowen et al. |
| 7,552,391 B2 | 6/2009 | Evans et al. |
| 7,558,884 B2 | 7/2009 | Fuller et al. |
| 7,590,713 B2 | 9/2009 | Brockway et al. |
| 7,612,783 B2 | 11/2009 | Koduri et al. |
| 7,783,985 B2 | 8/2010 | Indiran et al. |
| 8,176,155 B2 | 5/2012 | Yang et al. |
| 8,190,707 B2 | 5/2012 | Trivedi et al. |
| 2001/0028366 A1 * | 10/2001 | Ohki et al. ................. 345/772 |
| 2002/0054141 A1 | 5/2002 | Yen et al. |
| 2002/0057295 A1 | 5/2002 | Panasyuk et al. |
| 2002/0087225 A1 * | 7/2002 | Howard ................. 700/94 |
| 2002/0128288 A1 | 9/2002 | Kyle et al. |
| 2002/0129288 A1 | 9/2002 | Loh et al. |
| 2002/0140627 A1 * | 10/2002 | Ohki et al. ................. 345/1.1 |
| 2002/0163513 A1 | 11/2002 | Tsuji |
| 2002/0175933 A1 | 11/2002 | Ronkainen et al. |
| 2002/0182980 A1 | 12/2002 | Van Rompay |
| 2002/0186257 A1 | 12/2002 | Cadiz et al. |
| 2002/0196279 A1 | 12/2002 | Bloomfield et al. |
| 2003/0016205 A1 | 1/2003 | Kawabata et al. |
| 2003/0025689 A1 | 2/2003 | Kim |
| 2003/0041206 A1 * | 2/2003 | Dickie ................. 710/303 |
| 2003/0065934 A1 * | 4/2003 | Angelo et al. ................. 713/200 |
| 2003/0088800 A1 | 5/2003 | Cai |
| 2003/0090508 A1 | 5/2003 | Keohane et al. |
| 2003/0105812 A1 | 6/2003 | Flowers, Jr. et al. |
| 2003/0126335 A1 * | 7/2003 | Silvester ................. 710/303 |
| 2003/0160816 A1 | 8/2003 | Zoller et al. |
| 2003/0177172 A1 | 9/2003 | Duursma et al. |
| 2003/0179240 A1 | 9/2003 | Gest |
| 2003/0179244 A1 | 9/2003 | Erlingsson |
| 2003/0188144 A1 | 10/2003 | Du et al. |
| 2003/0189597 A1 | 10/2003 | Anderson et al. |
| 2003/0195950 A1 | 10/2003 | Huang et al. |
| 2003/0197739 A1 | 10/2003 | Bauer |
| 2003/0200435 A1 | 10/2003 | England et al. |
| 2003/0208529 A1 | 11/2003 | Pendyala et al. |
| 2003/0222876 A1 | 12/2003 | Giemborek et al. |
| 2003/0222915 A1 | 12/2003 | Marion et al. |
| 2003/0225872 A1 | 12/2003 | Bartek et al. |
| 2003/0229900 A1 | 12/2003 | Reisman |
| 2004/0001069 A1 | 1/2004 | Snyder et al. |
| 2004/0019724 A1 * | 1/2004 | Singleton et al. ................. 710/303 |
| 2004/0027315 A1 | 2/2004 | Senda et al. |
| 2004/0066414 A1 | 4/2004 | Czerwinski et al. |
| 2004/0070608 A1 | 4/2004 | Saka |
| 2004/0080482 A1 | 4/2004 | Magendanz et al. |
| 2004/0085328 A1 | 5/2004 | Maruyama et al. |
| 2004/0095382 A1 | 5/2004 | Fisher et al. |
| 2004/0145605 A1 | 7/2004 | Basu et al. |
| 2004/0153493 A1 | 8/2004 | Slavin et al. |
| 2004/0184523 A1 | 9/2004 | Dawson et al. |
| 2004/0222978 A1 | 11/2004 | Bear et al. ................. 345/184 |
| 2004/0224638 A1 | 11/2004 | Fadell et al. ................. 455/66.1 |
| 2004/0225901 A1 * | 11/2004 | Bear et al. ................. 713/300 |
| 2004/0225907 A1 | 11/2004 | Jain et al. |
| 2004/0235532 A1 | 11/2004 | Matthews et al. ................. 455/566 |
| 2004/0260565 A1 | 12/2004 | Zimniewicz et al. |
| 2004/0268004 A1 * | 12/2004 | Oakley ................. 710/303 |
| 2005/0025071 A1 | 2/2005 | Miyake et al. |
| 2005/0059346 A1 | 3/2005 | Gupta et al. |
| 2005/0064911 A1 * | 3/2005 | Chen et al. ................. 455/566 |
| 2005/0066209 A1 * | 3/2005 | Kee et al. ................. 713/323 |
| 2005/0073515 A1 * | 4/2005 | Kee et al. ................. 345/204 |
| 2005/0076088 A1 * | 4/2005 | Kee et al. ................. 709/206 |
| 2005/0076256 A1 * | 4/2005 | Fleck et al. ................. 713/320 |
| 2005/0091610 A1 | 4/2005 | Frei et al. |
| 2005/0097506 A1 | 5/2005 | Heumesser |
| 2005/0125739 A1 | 6/2005 | Thompson et al. |
| 2005/0132299 A1 | 6/2005 | Jones et al. |
| 2005/0140566 A1 | 6/2005 | Kim et al. |
| 2005/0182980 A1 * | 8/2005 | Sutardja ................. 713/320 |
| 2005/0240538 A1 | 10/2005 | Ranganathan |
| 2005/0240873 A1 | 10/2005 | Czerwinski et al. |
| 2005/0262302 A1 | 11/2005 | Fuller et al. |
| 2005/0268246 A1 | 12/2005 | Keohane et al. |
| 2006/0001595 A1 | 1/2006 | Aoki |
| 2006/0007051 A1 * | 1/2006 | Bear et al. ................. 345/1.1 |
| 2006/0085760 A1 | 4/2006 | Anderson et al. |
| 2006/0095617 A1 * | 5/2006 | Hung ................. 710/69 |
| 2006/0119537 A1 * | 6/2006 | Vong et al. ................. 345/1.3 |
| 2006/0119538 A1 * | 6/2006 | Vong et al. ................. 345/1.3 |
| 2006/0119602 A1 | 6/2006 | Fisher et al. |
| 2006/0125784 A1 | 6/2006 | Jang et al. |
| 2006/0129855 A1 | 6/2006 | Rhoten et al. |
| 2006/0130075 A1 * | 6/2006 | Rhoten et al. ................. 719/328 |
| 2006/0142878 A1 | 6/2006 | Banik et al. |
| 2006/0150230 A1 | 7/2006 | Chung et al. |
| 2006/0164324 A1 * | 7/2006 | Polivy et al. ................. 345/1.1 |
| 2006/0232494 A1 | 10/2006 | Lund et al. |
| 2006/0250320 A1 * | 11/2006 | Fuller et al. ................. 345/1.1 |
| 2006/0267857 A1 | 11/2006 | Zhang et al. |
| 2006/0267992 A1 | 11/2006 | Kelley et al. |
| 2006/0282855 A1 | 12/2006 | Margulis |
| 2007/0046562 A1 * | 3/2007 | Polivy et al. ................. 345/1.2 |
| 2007/0050727 A1 | 3/2007 | Lewis-Bowen et al. |
| 2007/0052615 A1 * | 3/2007 | Van Dongen et al. ................. 345/1.1 |
| 2007/0067655 A1 * | 3/2007 | Shuster ................. 713/300 |
| 2007/0079030 A1 * | 4/2007 | Okuley et al. ................. 710/62 |
| 2007/0083785 A1 * | 4/2007 | Sutardja ................. 713/323 |

(56) References Cited

U.S. PATENT DOCUMENTS

| | | | |
|---|---|---|---|
| 2007/0103383 A1* | 5/2007 | Sposato et al. | 345/1.1 |
| 2007/0195007 A1* | 8/2007 | Bear et al. | 345/1.1 |
| 2007/0273699 A1 | 11/2007 | Sasaki et al. | |
| 2008/0034318 A1 | 2/2008 | Louch et al. | |
| 2008/0130543 A1 | 6/2008 | Singh et al. | |
| 2008/0155478 A1 | 6/2008 | Stross | |
| 2008/0172626 A1* | 7/2008 | Wu | 715/764 |
| 2008/0297433 A1* | 12/2008 | Heller et al. | 345/2.1 |
| 2008/0320321 A1* | 12/2008 | Sutardja | 713/323 |
| 2009/0021450 A1* | 1/2009 | Heller et al. | 345/1.3 |
| 2009/0031329 A1* | 1/2009 | Kim | 719/327 |
| 2009/0059496 A1* | 3/2009 | Lee | 361/681 |
| 2009/0160865 A1 | 6/2009 | Grossman | |
| 2009/0172450 A1* | 7/2009 | Wong et al. | 713/324 |
| 2009/0193243 A1* | 7/2009 | Ely | 713/2 |
| 2010/0010653 A1* | 1/2010 | Bear et al. | 700/94 |
| 2010/0033433 A1* | 2/2010 | Utz et al. | 345/168 |
| 2010/0033916 A1* | 2/2010 | Douglas et al. | 361/679.28 |
| 2011/0219313 A1 | 9/2011 | Mazzaferri | |

OTHER PUBLICATIONS

Compaq et al.; "Universal Serial Bus Specification"; Apr. 27, 2000; Revision 2.0; chapters 1-4 and 10.*

"System Management Bus (SMBus) Specification," Version 2.0, Aug. 3, 2000 (pp. 1-59).

PCWorld.com, "Microsoft Pitches Display for Laptop Lids" dated Feb. 10, 2005, pp. 1-2, downloaded from the Internet on Mar. 8, 2006 from http://www.pcworld.com/resource/article/0.aid.119644.asp.

Microsoft Corporation, "Microsoft Windows Hardware Showcase", dated Apr. 28, 2005, pp. 1-5, downloaded from the Internet on Sep. 15, 2005 from http://www.microsoft.com/whdc/winhec/hwsowcase05.mspx.

Paul Thurrot's SuperSite for Windows, "WinHEC 2004 Longhorn Prototypes Gallery", dated May 10, 2004, pp. 1-4, downloaded from the internet on Sep. 15, 2005 from http://www.winsupersite.com/showcase/longhorn_winhec_proto.asp.

Vulcan Inc., "Connectivity FAQ", p. 1, downloaded from the internet on Sep. 20, 2005 from http://www.flipstartpc.com/faq_connectivity.asp.

Vulcan Inc., "Product Features: LID Module", p. 1, downloaded from the internet on Sep. 19, 2005 from http://www.flipstartpc.com/aboutproduct_features_lidmodule.asp.

Vulcan Inc., "Product Features: Size and Performance" p. 1 downloaded from the internet on Sep. 20, 2005 from http://www.flipstartpc.com/aboutproduct_features_sizeandpower.asp.

Vulcan Inc., "Software FAQ", p. 1, downloaded from the internet on Sep. 20, 2005 from http://www.flipstartpc.com/faq_software.asp.

Handtops.com, "FlipStart PC in detail", pp. 1-4, downloaded from the Internet on Sep. 20, 2005 from http://www.handtops.com/show/news/5.

"Usage: NVIDIA GeForce 6800—PCIe x16", Dell, archived Jan. 15, 2006 by archive.org, Downloaded Jun. 29, 2011, http://web.archive.org/web/20060115050119/http://support.dell.com/support/edocs/video/P82192/en/usage.htm.

"Graphics: Intel® 82852/82855 Graphics Controller Family", Intel, Archived Nov. 2, 2006 by archive.org, Downloaded Jun. 30, 2011, http://web.archive.org/web/20061103045644/http://www.intel.com/support/graphics/ intel852gm/sb/CS-009064.htm?.

"Epson: EMP Monitor V4.10 Operation Guide", by Seiko Epson Corp., 2006, http://support.epson.ru/products/manuals/100396/Manual/EMPMonitor.pdf.

"The Java Tutorial: How to Use Combo Boxes", Archived Mar. 5, 2006 by archive.org, Downloaded Jun. 30, 2011, http://web.archive.org/web/20050305000852/http://www-mips.unice.fr/Doc/Java/Tutorial/uiswing/components/ combobox.html.

"Epson; EMP Monitor V4, 10 Operation Guide", by Seiko Epson Corp., 2006 http://support.epson.ru/products/manuals/100396/Manual/EMPMonitor.pdf.

"Virtual Network Computing", http://en.wikipedia.org/wiki/Vnc, Downloaded Circa: Dec. 18, 2008, pp. 1-4.

McFedries, ebook, titled "Complete Idiot's Guide to Windows XP", published Oct. 3, 2001, pp. 1-7.

PCWorld.com, "Microsoft Pitches Display for Laptop Lids" dated Feb. 10, 2005, pp. 1-2, downloaded from the Internet on Mar. 8, 2006 from http://www.pcworld.com/resources/article/aid/119644.asp.

Vulcan, Inc., "Product Features: Size and performance", p. 1; downloaded from the internet on Sep. 20, 2005 from http://www.flipstartpc.com/aboutproduct_features_sizeandpower.asp.

Vulcan, Inc., "Product Features:LID Module", p. 1, downloaded from the Internet on Sep. 19, 2005 from http://www.flipstartpc.com/aboutproduct_features_lidmodule.asp.

Vulcan, Inc., "Software FAQ", p. 1, downloaded from the internet on Sep. 20, 2005 from http://www.flipstartpc.com/faq_software.asp.

* cited by examiner

METHOD AND SYSTEM FOR COMMUNICATION BETWEEN A SECONDARY PROCESSOR AND AN AUXILIARY DISPLAY SUBSYSTEM OF A NOTEBOOK

CROSS-REFERENCE TO RELATED APPLICATION

This application is related to the U.S. patent application entitled "Method and System for Displaying Data from Auxiliary Display Subsystem of a Notebook on a Main Display of the Notebook" by Arman Toorians, assigned to the assignee of the present application and filed on the same day as the present application.

FIELD OF THE INVENTION

The invention pertains to methods and circuitry for communication over a serial bus (e.g., a System Management Bus (SMB), I2C bus, or RS-232 bus) between an auxiliary display subsystem and a secondary processor (e.g., a conventional embedded controller) of a notebook that includes the auxiliary display subsystem. The communication can occur when the notebook is in a standby state or other low-power state, or when the notebook has been booted up into a fully-powered normal operating state.

BACKGROUND OF THE INVENTION

The expression "notebook" herein denotes a notebook computer, tablet PC, PDA (personal digital assistant), smart cellular phone (e.g., one capable of playing and displaying multimedia content), or other portable computer or computing system having a central processing unit ("CPU").

The expression "secondary processor" of a notebook (having a central processing unit) shall be used herein to denote any processor of the notebook other than the notebook's CPU. Examples of secondary processors of conventional notebook computers are embedded controllers (e.g., embedded controllers that perform keyboard controller functions as well as other functions).

The acronym "SMB" herein denotes the conventional, two-wire bus known as the "System Management Bus." The most recent version of the SMB is described in the System Management Bus (SMB) Specification, Version 2.0, published on Aug. 3, 2000, and available at http://www.smbus.org/specs.

The expression that a notebook is in a "low-power state" herein denotes that the notebook is operating in a state in which it consumes less power than if it were in a fully-powered, normal operating mode. Examples of low-power states are hibernation and standby states. Typically, a notebook has been booted up (and its central processing unit runs operating system software) when operating in a fully-powered normal operating state, but a notebook must perform a booting operation in order to undergo a transition from a low-power state to a fully-powered normal operating state.

The expression "auxiliary display subsystem" herein denotes a subsystem of a notebook that is configured to receive data (and typically cache the received data) from at least one other element of the notebook and to perform (while the notebook is in a standby state or other low-power state) at least one function that at least one other element of the notebook (external to the auxiliary display subsystem) could perform if the notebook were in a fully-powered normal operating mode. Examples of such functions include displaying cached video, still picture, or other image data (received from an element of the notebook external to the auxiliary display subsystem) or a processed version of such cached data on an auxiliary display, or causing such cached data or a processed version thereof to be displayed on all or part of the notebook's main display; playing back cached audio data (received from an element of the notebook external to the auxiliary display subsystem) or a processed version of such cached data; displaying system information (e.g., information regarding charge level of a battery of the notebook, or information regarding the notebook's state) on an auxiliary display or causing such system information to be displayed on all or part of the notebook's main display; and answering incoming telephone calls.

The expression "auxiliary display" herein denotes a display of the auxiliary display subsystem which is distinct from the main display of the notebook in which the auxiliary display subsystem is included. It should be appreciated that some embodiments of an auxiliary display subsystem do not include an auxiliary display, and instead are coupled and configured to cause the display of data on all or part of the notebook's main display (e.g., while the notebook is in a standby state or other low-power state).

It has been proposed that a notebook include an auxiliary display subsystem for caching data received from other elements of the notebook and displaying the cached data on an auxiliary display.

For example, US Patent Application 2004/0225901 (published on Nov. 11, 2004) discloses an auxiliary display system for use with a main computer (a personal computer or other computing device). The auxiliary display subsystem includes an auxiliary display, a memory, an auxiliary processor, and input devices, is operable while the main computer is in a standby state (e.g., to record voicemail, receive an incoming phone call, or play music), and is said to be capable of waking up the main computer while the main computer is in a standby state. The auxiliary display system can execute applications alone (without the main computer) or "in concert" with the main computer's "main processor."

US Patent Application 2004/0222978 (published on Nov. 11, 2004) discloses a control and communications panel for use with a main computer. The control and communications panel can include an auxiliary display, an auxiliary processor, and controls, and can be operable (e.g., to perform telephone or other communication functions) while elements of the main computer are powered down. Paragraph 0062 of Application 2004/0222978 suggests that control handling logic may be loaded into executable non-volatile memory (of the control and communication panel) and operated with a secondary processor (of the control and communication panel) to allow the control and communication panel to perform communication functions as long as some power is available even though the main computer's disk, main processor, main display, and network card are powered down.

US Patent Application 2004/0224638 (published Nov. 11, 2004) discloses a notebook with a built-in docking station for receiving a detachable media player having an auxiliary display and at least one data port (e.g., a USB port) for receiving image, audio, or other data from the notebook or sending data to the notebook. US Patent Application 2004/0224638 suggests generally that communication between the media player and notebook could be one way or two way, and could implement a master/slave, server/client, peer to peer, or other protocol.

US Patent Application 2005/0076088 (published on Apr. 7, 2005) teaches a notebook (or other computer system) having a main display and a detachable module (having a processor, memory, auxiliary display, and input devices such as a fingerprint reader) mounted on the back of the notebook's main display. The detachable module can communicate with the notebook's main processor via a processor bus or communications link (e.g., to wake up the main processor). The detachable module can also perform functions such as displaying email, accessing contact and calendar information, and playing music files (apparently by accessing data previously cached, so as to be accessible by the detachable module, at a time when the notebook was fully powered up and booted up) when the notebook is in a "quiescent low power mode" without the need to boot up the notebook and load its operating system.

Until the present invention, it had not been proposed to operate an auxiliary display subsystem of a notebook to communicate with a secondary processor (e.g., embedded controller) of the notebook while the notebook is in a standby state (or other low-power state) over a serial bus of the notebook, to receive system status data regarding the notebook from the secondary processor and/or to cause the secondary processor to wake up the notebook. Nor had it been proposed to employ for this purpose a serial bus of the notebook that is also employed to couple the secondary processor to at least one element of the notebook other than the auxiliary display subsystem.

SUMMARY OF THE INVENTION

In a class of embodiments, the invention is a method for communication over an SMB between an auxiliary display subsystem and a secondary processor (e.g., a conventional embedded controller) of a notebook that includes the auxiliary display subsystem, in such a manner that the method can be performed when the notebook is in a standby state or other low-power state or when the notebook has been booted up into a fully-powered normal operating state. By sending messages over the SMB to the secondary processor in accordance with the invention, the auxiliary display subsystem can cause the notebook to send system status data to the auxiliary display subsystem (e.g., while the notebook is in a standby state or other low-power state, and without booting up the notebook or causing it to enter a fully-powered state), and can cause the secondary processor to wake up the notebook. These embodiments enable a conventional notebook (including a secondary processor that is conventionally configured to operate as a host for communication over an SMB) to be modified to include an auxiliary display subsystem (including an auxiliary processor) therein, without requiring any modification of the notebook other than coupling of the auxiliary processor to an SMB segment along which the secondary processor is connected and coupling (if desired) of the auxiliary processor to another conventional serial bus (e.g., a USB) along which the notebook's CPU (e.g., the notebook's PC chipset which implements or includes the notebook's CPU) is conventionally connected.

In other embodiments, the invention is a method for communication, over an I2C bus (sometimes referred to as "I²C" bus), an RS-232 bus, or another serial bus (other than an SMB), between an auxiliary display subsystem and a secondary processor (e.g., a conventional embedded controller) of a notebook that includes the auxiliary display subsystem, in such a manner that the method can be performed when the notebook is in a standby state or other low-power state or when the notebook has been booted up into a fully-powered normal operating state. By sending messages over the serial bus to the secondary processor in accordance with the invention, the auxiliary display subsystem can cause the notebook to send system status data to the auxiliary display subsystem (e.g., while the notebook is in a standby state or other low-power state, and without booting up the notebook or causing it to enter a fully-powered state), and can cause the secondary processor to wake up the notebook.

Typical embodiments of the inventive method allow the auxiliary display subsystem to implement distributed processing in which the auxiliary display subsystem accesses the notebook's embedded controller over a serial bus to perform at least one function (e.g., to wake up the notebook's CPU) and accesses the notebook's CPU over another link or bus to perform at least one other function (e.g., to read audio and/or video data that is stored in the notebook while the CPU has been booted up and the notebook is in a fully-powered normal operating state). Preferably, the distributed processing is implemented such that a processor within the auxiliary display subsystem (an "auxiliary processor") performs only functions that consume relatively low amounts of power, and the auxiliary processor accesses the notebook's embedded controller and/or the notebook's CPU to cause the latter to perform any required functions that consume relatively large amounts of power (waking up the notebook's embedded controller and/or CPU as necessary to cause them to perform the latter functions).

Other aspects of the invention are circuits (e.g., integrated circuits) and systems (e.g., auxiliary display subsystems) for implementing any embodiment of the inventive method, and notebooks configured to perform any embodiment of the inventive method.

DETAILED DESCRIPTION OF PREFERRED EMBODIMENTS

In a class of embodiments, a conventional System Management Bus (SMB) is used as the underlying transport layer for communications between an auxiliary display subsystem and a secondary processor. The bus protocols implemented by preferred embodiments of the invention for communication over an SMB between an auxiliary display subsystem and a secondary processor are compliant with the above-cited System Management Bus (SMB) Specification, Version 2.0. Notation used herein for SMB protocol description is consistent with that employed in the cited System Management Bus (SMB) Specification, Version 2.0.

Figure 1:
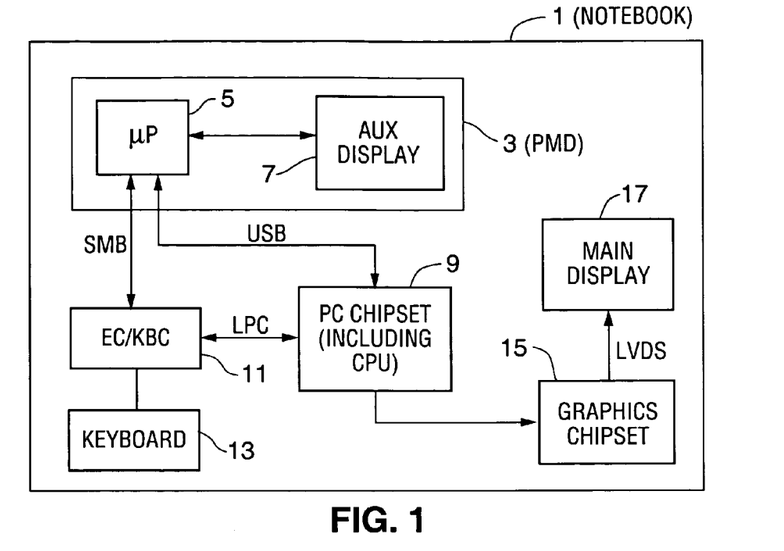
FIG. 1 is a block diagram of an embodiment of the inventive notebook, which includes an embodiment of the inventive auxiliary display subsystem (personal media display system or "PMD" 3) coupled by an SMB to an embedded controller (EC/KBC 11) of the notebook. EC/KBC 11 functions as a keyboard controller of the notebook. PMD 3 is also coupled by a conventional USB (universal serial bus) to PC chipset 9 of the notebook.

FIG. 1 is a block diagram of notebook computer ("notebook") 1 which includes conventional PC chipset 9 (including a CPU which runs notebook 1's operating system software when notebook 1 has been booted up into its fully-powered normal operating mode), graphics chipset 15, main display 17, keyboard 13, and embedded controller (EC/KBC 11), connected as shown. EC/KBC 11 is of a conventional type which functions as a keyboard controller. As shown, EC/KBC 11 is coupled to chipset 9 by a conventional low pin count ("LPC") bus, but in alternative implementations is coupled to chipset 9 by other means (e.g., by a conventional ISA bus or other bus). EC/KBC 11 is also coupled to keyboard 13 (e.g., by a conventional 26-pin cable) and typically also to other elements (not shown in FIG. 1) of notebook 1.

Notebook 1 also includes an embodiment of the inventive auxiliary display subsystem (personal media display system 3, to be referred to as "PMD" 3), which includes microprocessor 5 ("auxiliary processor" 5), auxiliary display 7 (coupled to and driven by microprocessor 5), and typically also other elements (to be described below). Microprocessor 5 is coupled by an SMB to embedded controller (EC/KBC) 11 for communication in accordance with the invention, with EC/KBC 11 conventionally configured to operate as an SMB host. Microprocessor 5 is coupled by a conventional USB (universal serial bus) to PC chipset 9 for communication with PC chipset 9. Typically, microprocessor 5 communicates with EC/KBC 11 over the SMB when chipset 9 is in a low-power state (e.g., a standby or hibernation state) or when chipset 9 is fully awake (and in a state in which it consumes full power), and microprocessor 5 communicates with chipset 9 over the USB when chipset 9 is fully awake (and in a state in which it consumes full power).

Notebook 1 typically includes elements (not shown in FIG. 1) in addition to those shown in FIG. 1. For example, it can include a smart battery (coupled to EC/KBC 11 by an SMB) and a smart battery charger (also coupled to EC/KBC 11 by an SMB).

PMD 3 typically also includes other elements (not shown in FIG. 1). For example, PMD 3 typically includes input devices (e.g., control buttons and a biometric sensor) and a memory. PMD 3 is typically configured to cache data received from other elements of notebook 1 as a result of communication over the USB between microprocessor 5 and PC chipset 9. PMD 3 is typically configured to display such cached data (in the case that the cached data are video or other image data) on auxiliary display 7 and to play back the cached data (in the case that the cached data are audio data) on loudspeakers (not shown) of notebook 1. PMD 3 is typically also configured to display (on auxiliary display 7) system status data received by microprocessor 5 from EC/KBC 11 over the SMB.

Examples of system status data that can be received by PMD 3 (e.g., for display on auxiliary display 7) from the non-PMD portion of notebook 1 (e.g., from EC/KBC 11 as described below) include indications that notebook 1 is on, off, shutting down, or powering up, indications that notebook 1 is in a standby, suspended, or hibernation state, indications that a battery of notebook 1 is charging or discharging, indications of the charge level of a battery of notebook 1, low battery alarms, indications that communication with the non-PMD portion of notebook 1 is in progress, notifications that the non-PMD portion of notebook 1 has received new email, and current time and date updates.

PMD 3 can also be configured to perform, while PC chipset 9 is in a standby or other low-power state, other functions (e.g., answering incoming telephone calls) that other elements of notebook 1 could perform if notebook 1 were in a fully-powered, normal operating state. When PC chipset 9 is in a low-power state, other major power-consuming elements of notebook 1 (e.g., main display 17) are typically off or in a standby or other low-power state so that notebook 1 as a whole is in a low-power state. Preferably, microprocessor 5 and other elements of PMD 3 are implemented to consume less power (preferably, much less power) than consumed by the elements of notebook 1 other than PMD 3 in a fully-powered, normal operating state. Thus, a user can employ PMD 3 to conserve power while performing useful functions of notebook 1 (while notebook 1 is in a low-power state), without the need to cause notebook 1's CPU (implemented by PC chipset 9) to boot up (which would typically consume significant time).

Functions that can be performed by various embodiments of PMD 3 include cached music file playing (with optional equalization, sample rate conversion, or other audio post processing), display of cached picture slide shows (e.g., on auxiliary display 7), display of world clock, time, and date information, stop watch functionality, display of contact lists, email, reminder memos, timed memos, task lists, battery and other information regarding notebook 1 and users thereof (e.g., user name and information, system information, manufacturer, serial number and model number, OEM support, technical contact information, and logos), password/screen lock support functions, system functions (e.g., placing notebook in an on, off, hibernation, standby, or suspend state), and lid-closed notebook system and application control functions.

Figure 2:
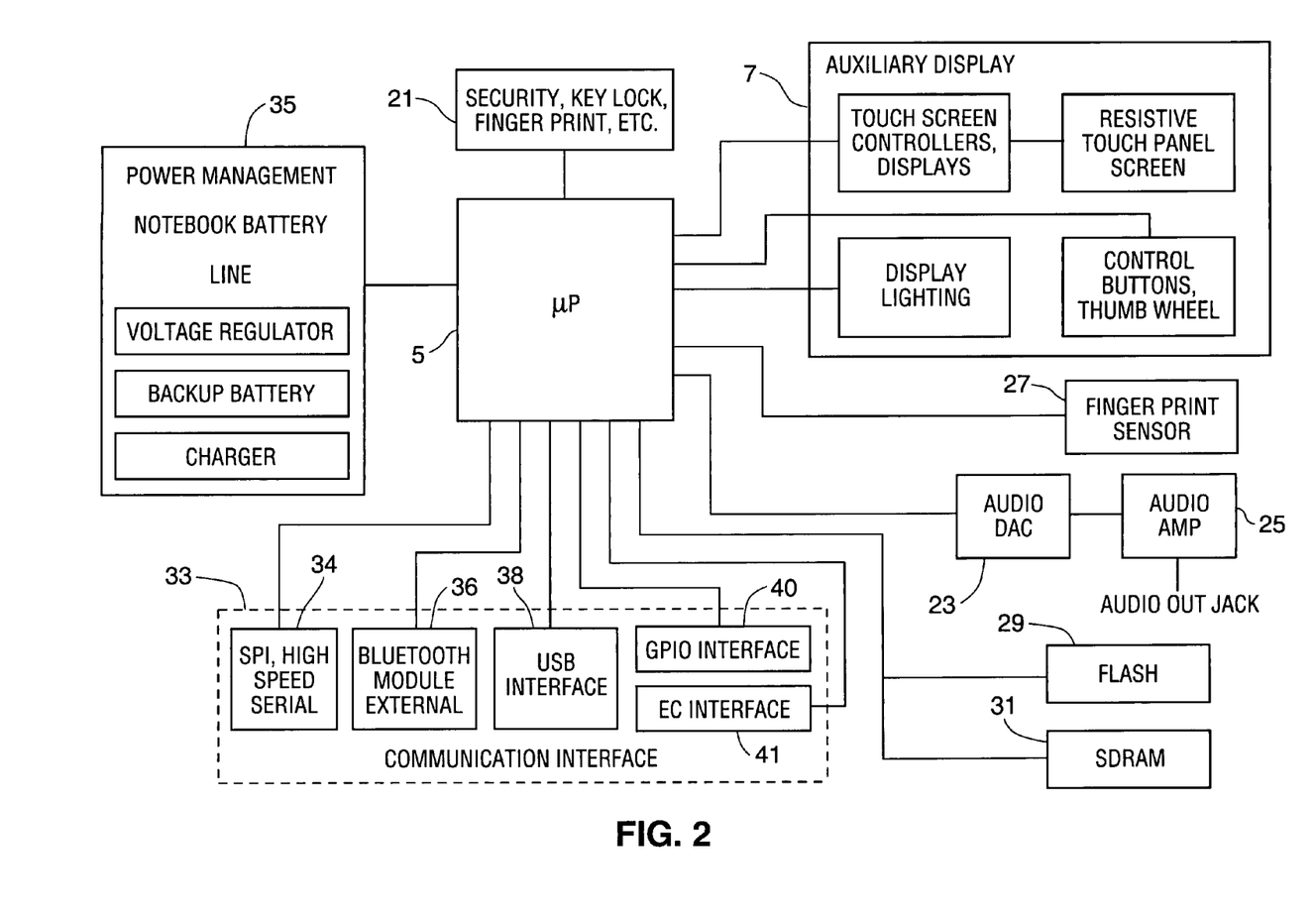
FIG. 2 is a block diagram of a typical implementation of PMD 3 of FIG. 1.

FIG. 2 is a block diagram of a typical implementation of PMD 3 of FIG. 1. In the FIG. 2 implementation, microprocessor 5 is a dual core, ARM-based microprocessor implemented to consume low power (e.g., to operate for 50 hours on power drawn from an AA battery), auxiliary display 7 includes touch-screen controller, a resistive touch panel screen, display lighting, and control buttons and a thumb wheel, connected as shown. Typically, when notebook 1 has the size and physical form of a conventional notebook computer (and thus includes a keyboard section and a cover attached by hinges to the keyboard section, with the main display installed to be visible from the cover's front surface), PMD 3 is installed in the notebook computer's cover with the touch panel screen, control buttons, and thumb wheel of auxiliary display 7 accessible from the cover's back surface (so as to be accessible when the cover's front surface is folded against the keyboard section to protect the main display).

In the FIG. 2 implementation, PMD 3 includes communication interface subsystem 33 (coupled to microprocessor 5), which can include high speed serial interface 34, Bluetooth module 36, USB interface 38 (configured to be coupled by USB conductors to PC chipset 9), GPIO interface 40, and EC interface 41 (configured to be coupled by SMB conductors to EC/KBC 11), and other interface circuitry (e.g., RF, 802.11, Ethernet, and/or IR interface circuitry). In the FIG. 2 implementation, microprocessor 5 includes an internal boot block ROM (not separately shown), and PMD 3 includes NOR/NAND flash memory 29 and SRAM/SDRAM 31, security input device 21 (e.g., a key lock), audio DAC 23, and fingerprint sensor 27, all coupled to microprocessor 5. Audio amplifier 25 is coupled to the output of DAC 23 for amplifying the analog audio that is output from DAC 23, and amplifier 25 can drive speakers which are external to PMD 3 (e.g., headphones plugged into a connector of PMD 3).

Fingerprint sensor 27 is used to authenticate users of PMD 3, using user identity data cached in memory (e.g., memory 29 or 31) of PMD 3. When typically programmed, PMD 3 can be placed in a locked state in which it can be unlocked by an authorized user only after PMD 3 successfully authenticates the user (even while notebook 1 is in a standby state or other low-power state, and without waking up notebook 1) including by comparing user biometric data (e.g., a fingerprint) with cached biometric data.

In the FIG. 2 implementation, PMD 3 also includes analog power management circuitry 35 coupled to microprocessor 5. Circuitry 35 includes at least one voltage regulator (e.g., voltage regulators for regulating each of a 2.9 Volt digital supply voltage, a 2.9 Volt analog supply voltage, a peripheral supply voltage in the range 1.7 to 3.3 Volts, an RTC supply voltage in the range 1 Volt to 2.5 Volts, and a 3.26 Volt USB transceiver voltage), a battery charger, a backup battery, and a DC-to-DC converter for providing a 3.2 or 3.4 V output in response to an input voltage in the range from 1.0 Volt to 3.3 Volts.

PMD 3 is typically configured to cache (e.g., in memory 29 and/or memory 31) data received from other elements of notebook 1 as a result of communication over the USB between microprocessor 5 and PC chipset 9. PMD 3 is typically configured to display such cached data (in the case that the cached data are video or other image data) on auxiliary display 7 and to play back the cached data (in the case that the cached data are audio data) on loudspeakers (not shown) of notebook 1. PMD 3 is typically also configured to display (on auxiliary display 7) system status data received by microprocessor 5 from EC/KBC 11 over the SMB. Microprocessor 5 (and other elements of PMD 3) can also be configured to implement digital rights management (e.g., to decrypt content received from elements of notebook 1 external to PMD 3, and to store, in read-only memory, unique identification data for digital rights management algorithms).

PMD 3 is typically also configured to perform one or more of the following functions:

provide low power, instant access to music and multimedia content cached in memory (e.g., memory 29 and/or memory 31) of PMD 3 and other information (e.g., critical information) cached in memory of PMD 3 (e.g., frequently used information transferred from other elements of notebook 1 and cached in PMD 3 before notebook 1 enters a standby or other low-power state);

allow a user to control notebook 1 with the cover of main display 17 closed (e.g., by waking up notebook 1 and controlling notebook 1 by actuating controls on or associated with auxiliary display 7, while main display 17 is covered and thus protected and unavailable); and boot loader in PMD 3's flash memory 29, and loading and executing a firmware boot loader), boot loader support (stored in PMD 3's flash memory 29, for authenticating firmware and device drivers and executing firmware), firmware kernel, file system, graphic tool kit, and drivers (e.g., USB, SMB, I2S, display controller, touch screen, and JTAG debugger support).

Several elements of the FIG. 2 implementation of PMD 3 (e.g., microprocessor 5 and circuitry 23, 25, and 35) can be and preferably are integrated in a single chip.

Any device on an SMB has a unique 7-bit address. In a conventional notebook architecture, the embedded controller which functions as keyboard controller (e.g., EC/KBC 11 of FIG. 1) is conventionally assigned SMB host device address 0001_000b.

In a class of implementations of FIG. 1, microprocessor 5 is assigned SMB device address 1000_101b as a default address for receiving messages over the SMB, and embedded controller (EC/KBC) 11 is assigned SMB host device address 0001_000b for receiving messages over the SMB. Preferably, notebook 1 is implemented so that if another device with the address 1000_101b is connected to the same SMB segment as is microprocessor 5, the default address for microprocessor 5 can be reprogrammed in firmware.

Typical SMB messages sent from microprocessor 5 (an SMB device acting as bus master) to EC/KBC 11 (an SMB host controller acting as bus slave) include data requests and action requests of any of the types described below.

In accordance with preferred embodiments of the invention, microprocessor 5 (an SMB device acting as bus master) sends messages to EC/KBC 11 (an SMB host controller acting as bus slave) in accordance with the SMB host notify protocol described in the above-cited SMB specification. In accordance with this protocol, the SMB device master can send to the SMB host controller (functioning as an SMB slave) 16-bit messages (each preceded by two 8-bit words that indicate the target and sending device addresses, with transmission of each 8-bit word followed by an "acknowledge" bit) in the following format:

| 1 | 7 | 1 | 1 | 7 | 1 | 1 | 8 | 1 | 8 | 1 | 1 |
|---|---|---|---|---|---|---|---|---|---|---|---|
| S | Target Address | Wr | A | Sending Device Address | | A | Data Byte Low | A | Data Byte High | A | P |
| | SMB Host Address | 0 | 0 | PMD Address | | 0 | Command | 0 | Sub-Command | 0 | | provide other functionality such as generating alarms (e.g., for elapsed time or scheduled events, or low battery alarms indicating that notebook 1's battery is nearly discharged), implementing user authentication (or other security functions) preliminary to booting of notebook 1's CPU, collecting and monitoring system diagnostics data (e.g., data indicating whether notebook 1 is shutting down, powering up, whether notebook 1 is in an on, off, standby, suspended, or hibernation state, whether notebook 1's battery is charging/discharging, and the charge level of notebook 1's battery), and communicating with notebook 1's operating system software regarding system power management policies.

Microprocessor 5 is preferably programmed with firmware for executing appropriate functions and with software for executing functions including the following: boot block (e.g., for initializing microprocessor 5's CPU and PMD 3's flash memory 29 and other memory, authenticating a firmware In the previous paragraph, "S" denotes the conventional SMB "start condition" which the transmitter of the message (the SMB device master) must assert on the SMB to indicate the start of transmission of a message comprising a number of 8-bit packets separated by "acknowledge" bits, "Wr" denotes a command bit (whose bit value is 0 during transmission in accordance with the host notify protocol), "A" denotes an acknowledge bit (whose value is 0 for an ACK and 1 for a NACK), "P" denotes the conventional SMB "stop condition" which the message transmitter asserts on the SMB to indicate the end of transmission of a message, and the two 8-bit words "Data Byte Low" and "Data Byte High" are the body of the message. The 8-bit sending device address indicates to the message recipient (the SMB host controller slave) the origin of the message.

Depending on the command field value (the above-indicated 8-bit word "Data Byte Low"), all messages from microprocessor 5 to EC/KBC 11 can be divided into two categories: data requests and action requests.

In accordance with preferred embodiments of the invention, data requests (asserted from microprocessor 5 to EC/KBC 11) have the format indicated in Tables 1 and 2 below. Table 1 indicates the format of each data request's command field value (the above-indicated 8-bit word "Data Byte Low"), and Table 2 indicates the format of each data request's sub-command field value (the above-indicated 8-bit word "Data Byte High") and bits 3:0 of the data request's command field.

TABLE 1

Data Request Commands

| Command Field Bit(s) | Description |
| --- | --- |
| 7:5 | Requestor Tag<br>000b - Invalid<br>Others - Assigned by microprocessor 5 (no context for EC/KBC 11) |
| 4 | Message Type<br>0b - Data Request |
| 3:0 | Command Code<br>0h - EC Capabilities<br>1h - System Status<br>2h - Battery Information<br>Others - Reserved |

TABLE 2

Data Request Sub-Commands

| Command Field Bits 3:0 | Sub-Command Field Bit(s) | Description |
| --- | --- | --- |
| 0h | 7:0 | Reserved (00h) |
| 1h | 7:0 | Reserved (00h) |
| 2h | 7:4 | Battery Slot Tag<br>0h - Battery Slot 0<br>1h - Battery Slot 1<br>2h - Battery Slot 2<br>3h - Battery Slot 3<br>Others - Reserved |
| | 3:0 | Battery Information<br>0h - Battery Slot Status and Capacity Gauge<br>1h - Battery Voltage<br>2h - Battery Remaining Time to Empty<br>3h - Battery Charging/Discharging Rate<br>4h - Battery Remaining Capacity<br>5h - Battery Last Full Charge Capacity<br>6h - Battery Design Capacity<br>7h-Bh - Reserved<br>Ch - Battery Manufacturer Name<br>Dh - Battery Model<br>Eh - Battery Type<br>Fh - Reserved |

In accordance with preferred embodiments of the invention, action requests (asserted from microprocessor 5 to EC/KBC 11) have the format indicated in Tables 3 and 4 below. Table 3 indicates the format of each action request's command field value (the above-indicated 8-bit word "Data Byte Low"), and Table 4 indicates the format of each action request's sub-command field value (the above-indicated 8-bit word "Data Byte High") and bits 3:0 of the action request's command field.

TABLE 3

Action Request Commands

| Command Field Bit(s) | Description |
| --- | --- |
| 7:5 | Requestor Tag<br>000b - Invalid<br>Others - Assigned by microprocessor 5 (no context for EC/KBC 11) |
| 4 | Message Type<br>1b - Action Request |
| 3:0 | Command Code<br>0h - EC/KBC GPIO Control<br>1h - System Sleep State control<br>2h - Generate System Wake Event<br>3h - Generate System Run Time Event<br>Others - Reserved |

TABLE 4

Action Request Sub-Commands

| Command Field Bits 3:0 | Sub-Command Field Bit(s) | Description |
| --- | --- | --- |
| 0h | 7:6 | Reserved (00b) |
| | 5:4 | Requested GPIO state<br>00b - Output Low<br>01b - Output High<br>1Xb - Input |
| | 3:0 | EC/KBC GPIO number (mapping of this number to EC/KBC 11's physical GPIO is preferably done by EC/KBC firmware)<br>00h-0Fh - GPIO0-GPIO15 |
| 1h | 7:0 | Requested System Sleep State<br>00h - Invalid<br>01h - ACPI S1 state (Standby)<br>02h - ACPI S2 State<br>03h - ACPI S3 State (Suspend to RAM)<br>04h - ACPI S4 State (Suspend to Disk, Hibernation)<br>05h - ACPI S5 State (System is Off)<br>06h - User defined state (emulate power/sleep button event)<br>Others - Reserved |
| 2h | 7:0 | PMD Wake Event ID reported by EC/KBC 11 to PC chipset 9 of notebook 1<br>00h-FFh - ID0-ID255 |
| 3h | 7:0 | PMD Run Time Event ID reported by EC/KBC 11 to PC chipset 9 of notebook 1<br>00h-FFh - ID0-ID255 |

In Tables 3 and 4, "GPIO" denotes "general purpose input/output." Action requests having the values indicated in Tables 3 and 4 in its command and sub-command fields can be asserted over the SMB to EC/KBC 11 to cause EC/KBC 11 to assert values (indicated by the messages) on specific GPIO pins of EC/KBC 11 (indicated by the messages) to control other elements of the notebook. The GPIO connections (to the elements of the notebook to be controlled) could be of a type present in a conventional notebook, but they are controlled in accordance with the present invention by action requests asserted from PMD 3 over an SMB (or another serial bus, in alternative embodiments of the invention) to EC/KBC 11 (or another embedded controller). For example (in one embodiment of the invention), microprocessor 5 of PMD 3 could assert action request messages over the SMB of FIG. 1 (or FIG. 3) to EC/KBC 11 to cause EC/KBC 11 to assert control bits (indicated by the messages) on specific GPIO lines (also indicated by the messages) to an audio amplifier of the notebook, where such amplifier (not shown in the Figures) is coupled in a conventional manner to EC/KBC 11 by such GPIO lines.

We next describe messages sent over the SMB from EC/KBC 11 (an SMB host controller acting as bus master) to microprocessor 5 (an SMB device acting as bus slave). In preferred embodiments of the invention, the SMB write block protocol with the following format is used for all messages sent over the SMB from EC/KBC 11 (acting as bus master) to microprocessor 5. In accordance with this protocol, the SMB host controller master can send to microprocessor 5 (functioning as an SMB slave) N*8-bit messages (where N is an integer), each preceded by three 8-bit words that indicate microprocessor 5's address, a data report command, and a message byte count (indicative of the value of N), with transmission of each 8-bit word followed by an "acknowledge" bit) in the following format:

| 1 | 7 | 1 | 1 | 8 | 1 | 8 | 1 | 8 | 1 |
|---|---|---|---|---|---|---|---|---|---|
| S | Slave Address PMD Address | Wr 0 | A 0 | Command Data Report Command | A 0 | Byte Count N (2-32) | A 0 | Data Byte 1 Sub-Command | A 0 ... |

| 8 | 1 | 8 | 1 | | 8 | 1 | 8 | 1 | 1 |
|---|---|---|---|---|---|---|---|---|---|
| Data Byte 2 Report Status | A 0 | Data Byte 3 Report Data | A 0 | ... | Data Byte N Report Data | A 0 | PEC$^1$ | A 0 | P |

In the previous paragraph, "S" denotes the conventional SMB "start condition" which the transmitter of the message (the SMB host controller acting as bus master) must assert on the SMB to indicate the start of transmission of a message comprising a number of 8-bit packets separated by "acknowledge" bits, "Wr" denotes a command bit (whose bit value is 0 during transmission in accordance with the write block protocol), "A" denotes an acknowledge bit (whose value is 0 for an ACK and 1 for a NACK), "PEC" is a Packet Error Code, "P" denotes the conventional SMB "stop condition" which the message transmitter asserts on the SMB to indicate the end of transmission of a message, and the N 8-bit words "Data Byte" are the body of the message. The 7-bit slave address is the address of microprocessor 5. The Packet Error Code (PEC) byte is an optional CRC-8 error checking byte, and if included, it is appended after the last Data Byte of the message body and its usage is consistent with the PEC support bit included in an EC Capabilities Report (see Table 8 below).

Messages having the above-described format that are sent over the SMB from EC/KBC 11 (acting as bus master) to microprocessor 5 (acting as bus slave) are Data Report messages (each comprising N bytes that follow three initial address, command, and message byte count bytes), with the first byte of each N-byte message being a sub-command (i.e., the sub-command field of the Data Report Message), and the second byte of each N-byte message being a Report Status byte. A non-zero value of the Report Status byte indicates report failure. If the Report Status byte has a zero value, the report data transferred in the subsequent bytes of the message provide system information according to the command and sub-command fields.

The command byte transmitted following the address byte is sometimes denoted herein as the Command field of the Data Report Message. The content of the Command and Sub-Command fields of Data Report Messages from EC/KBC 11 is summarized in Table 5 and Table 6 below.

TABLE 5

Data Report Commands

| Command Field Bit(s) | Description |
|---|---|
| 7:5 | Requestor Tag<br>000b - No requestor (message initiated by EC/KBC 11 itself)<br>Others - Same as in the PMD data request which triggered the report (used internally by microprocessor 5 to properly route the report) |
| 4 | Message Type<br>0b - Data Report |
| 3:0 | Command Code<br>0h - EC Capabilities<br>1h - System Status |

TABLE 5-continued

Data Report Commands

| Command Field Bit(s) | Description |
|---|---|
| | 2h - Battery Information<br>Others - Reserved |

TABLE 6

Data Report Sub-Commands

| Command Field Bits 3:0 | Sub-Command Field Bit(s) | Description |
|---|---|---|
| 0h | 7:0 | Reserved (00h) |
| 1h | 7:0 | Reserved (00h) |
| 2h | 7:4 | Battery Slot Tag<br>0h - Battery Slot 0<br>1h - Battery Slot 1<br>2h - Battery Slot 2<br>3h - Battery Slot 3<br>Others - Reserved |
| | 4:0 | Battery Information<br>0h - Battery Slot Status and Capacity Gauge<br>1h - Battery Voltage<br>2h - Battery Remaining Time to Empty<br>3h - Battery Charging/Discharging Rate<br>4h - Battery Remaining Capacity<br>5h - Battery Last Full Charge Capacity<br>6h - Battery Design Capacity<br>7h-Bh - Reserved<br>Ch - Battery Manufacturer Name<br>Dh - Battery Model<br>Eh - Battery Type<br>Fh - Reserved |

The Command and Sub-Command fields for each Data Report message from EC/KBC 11 are the same as the respective fields in the above-described data requests from microprocessor 5 with one exception: a "no requestor" tag can be specified if a Data Report is initiated by EC/KBC 11 itself (and is not a response to a data request from microprocessor 5).

Table 7 specifies values of the Report Status byte (the above-described second byte) of each N-byte Data Report message, and allowable Byte Count values that correspond to each value of the Report Status byte.

TABLE 7

Data Report Status and Byte Count

| Report Status | Byte Count | Description |
|---|---|---|
| 00h | 3-32 | Report Successful. Following the Report Status byte, at least one data byte is, and as many as 30 data bytes are, returned according to the command and subcommand fields |
| 01h | 2 | Report Failed: attempt to access unsupported battery slot, or access to empty slot. A Battery Slot Status report must be returned successfully even for an empty slot. The "battery present flag" should be cleared in this case. |
| 02h | 2 | Report Failed: unknown data |
| 0FFh | 2 | Report Failed: any other reason than described above |
| Others | 2 | Reserved |

No data is reported by failed report (no data bytes follow a Report Status byte having a non-zero value). Data fields for all successful Data Reports from EC/KBC 11 are defined below (the requestor tag for all report examples below is set to 001b).

Table 8 specifies value for the Command and Sub-command fields, Byte Count and Report Status bytes, and data bytes of an "EC Capabilities" Data Report message (indicated in Tables 1 and 5 above).

TABLE 8

EC Capabilities Data Report

| SMB Protocol Byte | Value | Note |
|---|---|---|
| Command Byte | 20h | |
| Byte Count | 08h | |
| Data Byte 1 (Sub-Command) | 00h | |
| Data Byte 2 (Report Status) | 00h | Successful |
| Data Byte 3 | Version Number (10h = version 1.0) | Indicates the specification version with which EC/KBC 11 is compliant (the major version is specified in the high nibble, the minor version in the low nibble) |
| Data Byte 4 | GPIO allocation | Number of GPIO pins of EC/KBC 11 that are allocated for PMD control (up to 16) |
| Data Byte 5 | Battery System Configuration | See Table 9 |
| Data Byte 6 | Supported System Sleep States | See Table 10 |
| Data Byte 7 | Reserved (00h) | |
| Data Byte 8 | Reserved (00h) | |

TABLE 9

Battery System Configuration

| Battery System Configuration Bit(s) | Description |
|---|---|
| 7:5 | Reserved (000b) |
| 4 | PEC Support bit |
| | 0b - EC/KBC messages to microprocessor 5 do not use a protocol with PEC |
| | 1b - EC/KBC messages to microprocessor 5 use a protocol with PEC |
| 3:0 | Number Battery Slots (maximum number of batteries in the system) |
| | 0h - Invalid |
| | 1h - One Battery Slot 0 |
| | 2h - Two Battery Slots 1 and 2 |
| | 3h - Three Battery Slots 0, 1 and 2 |
| | 4h - Four Battery Slots 0, 1, 2 and 3 |
| | Others - Reserved |

TABLE 10

System Sleep States Support

| System Sleep Sate Support Bit(s) | Description |
|---|---|
| 7 | Reserved (0b) |
| 6 | User defined state (emulate power/sleep button event) |
| 5 | ACPI S5 state (System is Off) |
| 4 | ACPI S4 state (Suspend to Disk, Hibernation) |
| 3 | ACPI S3 state (Suspend to RAM) |
| 2 | ACPI S2 state |
| 1 | ACPI S1 state (Standby) |
| | 0b - Sleep state is not supported |
| | 1b - Sleep state is supported |
| 0 | Reserved (0b) |

Table 11 specifies value for the Command and Sub-command fields, Byte Count and Report Status bytes, and data bytes of a "System Status" Data Report message (indicated in Tables 1 and 5 above).

TABLE 11

System Status Report

| SMB Protocol Byte | Value | Note |
|---|---|---|
| Command Byte | 21h | |
| Byte Count | 08h | |
| Data Byte 1 (Sub-Command) | 00h | |
| Data Byte 2 (Report Status) | 00h | Successful |
| Data Byte 3 | System State Bits 7-0 | See Table 12 |
| Data Byte 4 | System State Bits 15-8 | See Table 12 |
| Data Byte 5 | GPIO State Bits 7-0 | Each bit 15-0 returns the state of the respective GPIO pin, GPIO15-GPIO0. Non supported GPIOs should be reported as "0." |
| Data Byte 6 | GPIO State Bits 15-8 | |
| Data Byte 7 | Reserved (00h) | |
| Data Byte 8 | Reserved (00h) | |

TABLE 12

System State Flags

| System State Bit(s) | Description |
|---|---|
| 15 | Battery in Slot 3 Present |
| 14 | Battery in Slot 2 Present |
| 13 | Battery in Slot 1 Present |
| 12 | Battery in Slot 0 Present |
|  | 0b - Battery is not present in the respective Slot |
|  | 1b - Battery is present in the respective Slot |
| 11:6 | Reserved (000000b) |
| 5 | LID State |
|  | 0b - LID closed |
|  | 1b - LID open |
| 4 | AC Present |
|  | 0b - No AC (Battery Power) |
|  | 1b - AC Present |
| 3:0 | System Power State |
|  | 0h - ACPI S0 state (System is On) |
|  | 1h - ACPI S1 state (Standby) |
|  | 2h - ACPI S2 State |
|  | 3h - ACPI S3 State (Suspend to RAM) |
|  | 4h - ACPI S4 State (Suspend to Disk, Hibernation) |
|  | 5h - ACPI S5 State (System is Off) |
|  | Others - Reserved |

Table 13 specifies value for the Command and Sub-command fields, Byte Count and Report Status bytes, and data bytes of a "Battery Information" Data Report message (indicated in Tables 1 and 5 above) of the "Slot Status and Capacity Gauge" type (indicated in Table 6 above).

TABLE 13

Battery Information (Slot Status and Capacity Gauge) Report

| SMB Protocol Byte | Value | Note |
|---|---|---|
| Command Byte | 22h |  |
| Byte Count | 04h |  |
| Data Byte 1 (Sub-Command) | X0h | X = 0h for Battery in Slot 0 |
|  |  | X = 1h for Battery in Slot 1 |
|  |  | X = 2h for Battery in Slot 2 |
|  |  | X = 3h for Battery in Slot 3 |
| Data Byte 2 (Report Status) | 00h | Successful |
| Data Byte 3 | Battery Slot Status | See Table 14 |
| Data Byte 4 | Battery Capacity Gauge | Battery's relative remaining capacity in % |

TABLE 14

Battery Slot Status

| Status Bit(s) | Description |
|---|---|
| 7:5 | Reserved (000b) |
| 4 | Discharging Alarm |
|  | 0b - No alarm |
|  | 1b - Alarm is set |
| 3 | Charging Alarm |
|  | 0b - No alarm |
|  | 1b - Alarm is set |
| 2:1 | Charging state |
|  | 00b - Battery is idle (self-discharging) |
|  | 01b - Battery is being charged |
|  | 10b - Battery is being discharged (powering the system) |
|  | 11b - Reserved |
| 0 | Present State |
|  | 0b - Battery is not present in the respective slot |
|  | 1b - Battery is present in the respective slot |

Table 15 specifies value for the Command and Sub-command fields, Byte Count and Report Status bytes, and data bytes of a "Battery Information" Data Report message (indicated in Tables 1 and 5 above) of the "Battery Voltage" type (indicated in Table 6 above).

TABLE 15

Battery Voltage Report

| SMB Protocol Byte | Description | Note |
|---|---|---|
| Command Byte | 22h |  |
| Byte Count | 04h |  |
| Data Byte 1 (Sub-Command) | X1h | X = 0h for Battery in Slot 0 |
|  |  | X = 1h for Battery in Slot 1 |
|  |  | X = 2h for Battery in Slot 2 |
|  |  | X = 3h for Battery in Slot 3 |
| Data Byte 2 (Report Status) | 00h | Successful |
| Data Byte 3 | Present Voltage Bits 7-0 | Battery's present voltage (16-bit unsigned value, in [mV]) |
| Data Byte 4 | Present Voltage Bits 15-8 |  |

Table 16 specifies value for the Command and Sub-command fields, Byte Count and Report Status bytes, and data bytes of a "Battery Information" Data Report message (indicated in Tables 1 and 5 above) of the "Battery Remaining Time to Empty" type (indicated in Table 6 above).

TABLE 16

Battery Remaining Time to Empty Report

| SMB Protocol Byte | Description | Note |
|---|---|---|
| Command Byte | 22h |  |
| Byte Count | 04h |  |
| Data Byte 1 (Sub-Command) | X2h | X = 0h for Battery in Slot 0 |
|  |  | X = 1h for Battery in Slot 1 |
|  |  | X = 2h for Battery in Slot 2 |
|  |  | X = 3h for Battery in Slot 3 |
| Data Byte 2 (Report Status) | 00h | Successful |
| Data Byte 3 | Time to Empty Bits 7-0 | Estimated remaining time to empty for discharging battery at present rate (in [min]) Report 0FFFFh if battery is not discharging |
| Data Byte 4 | Time to Empty Bits 15-8 |  |

Table 17 specifies value for the Command and Sub-command fields, Byte Count and Report Status bytes, and data bytes of a "Battery Information" Data Report message (indicated in Tables 1 and 5 above) of the "Battery Charging/Discharging Rate" type (indicated in Table 6 above).

TABLE 17

Battery Charging/Discharging Rate Report

| SMB Protocol Byte | Description | Note |
|---|---|---|
| Command Byte | 22h |  |
| Byte Count | 06h |  |
| Data Byte 1 (Sub-Command) | X3h | X = 0h for Battery in Slot 0 |
|  |  | X = 1h for Battery in Slot 1 |
|  |  | X = 2h for Battery in Slot 2 |
|  |  | X = 3h for Battery in Slot 3 |
| Data Byte 2 (Report Status) | 00h | Successful |
| Data Byte 3 | Rate Bits 7-0 | Battery's charging/discharging rate (24-bit unsigned value in specified Rate Units; direction is reported in Slot Status). |
| Data Byte 4 | Rate Bits 15-8 |  |
| Data Byte 5 | Rate Bits 23-16 |  |

TABLE 17-continued

Battery Charging/Discharging Rate Report

| SMB Protocol Byte | Description | Note |
|---|---|---|
| Data Byte 6 | Rate Units | 00h = [mW]<br>01h = [mA]<br>02h = [10 mW] |

Table 18 specifies value for the Command and Sub-command fields, Byte Count and Report Status bytes, and data bytes of a "Battery Information" Data Report message (indicated in Tables 1 and 5 above) of the "Battery Remaining Capacity" type (indicated in Table 6 above).

TABLE 18

Battery Remaining Capacity

| SMB Protocol Byte | Description | Note |
|---|---|---|
| Command Byte | 22h | |
| Byte Count | 06h | |
| Data Byte 1 (Sub-Command) | X4h | X = 0h for Battery in Slot 0<br>X = 1h for Battery in Slot 1<br>X = 2h for Battery in Slot 2<br>X = 3h for Battery in Slot 3 |
| Data Byte 2 (Report Status) | 00h | Successful |
| Data Byte 3 | Capacity Bits 7-0 | Battery's remaining capacity |
| Data Byte 4 | Capacity Bits 15-8 | (24-bit unsigned value in |
| Data Byte 5 | Capacity Bits 23-16 | specified Capacity Units) |
| Data Byte 6 | Capacity Units | 00h = [mWh]<br>01h = [mAh]<br>02h = [10 mWh] |

Table 19 specifies value for the Command and Sub-command fields, Byte Count and Report Status bytes, and data bytes of a "Battery Information" Data Report message (indicated in Tables 1 and 5 above) of the "Battery Last Full Charge Capacity" type (indicated in Table 6 above).

TABLE 19

Battery Last Full Charge Capacity

| SMB Protocol Byte | Description | Note |
|---|---|---|
| Command Byte | 22h | |
| Byte Count | 06h | |
| Data Byte 1 (Sub-Command) | X5h | X = 0h for Battery in Slot 0<br>X = 1h for Battery in Slot 1<br>X = 2h for Battery in Slot 2<br>X = 3h for Battery in Slot 3 |
| Data Byte 2 (Report Status) | 00h | Successful |
| Data Byte 3 | Capacity Bits 7-0 | Battery's capacity when fully |
| Data Byte 4 | Capacity Bits 15-8 | charged last time (24-bit |
| Data Byte 5 | Capacity Bits 23-16 | unsigned value in specified Capacity Units) |
| Data Byte 6 | Capacity Units | 00h = [mWh]<br>01h = [mAh]<br>02h = [10 mWh] |

Table 20 specifies value for the Command and Sub-command fields, Byte Count and Report Status bytes, and data bytes of a "Battery Information" Data Report message (indicated in Tables 1 and 5 above) of the "Battery Design Capacity" type (indicated in Table 6 above).

TABLE 20

Battery Design Capacity

| SMB Protocol Byte | Description | Note |
|---|---|---|
| Command Byte | 22h | |
| Byte Count | 06h | |
| Data Byte 1 (Sub-Command) | X6h | X = 0h for Battery in Slot 0<br>X = 1h for Battery in Slot 1<br>X = 2h for Battery in Slot 2<br>X = 3h for Battery in Slot 3 |
| Data Byte 2 (Report Status) | 00h | Successful |
| Data Byte 3 | Capacity Bits 7-0 | Battery's design (24-bit |
| Data Byte 4 | Capacity Bits 15-8 | unsigned value in specified |
| Data Byte 5 | Capacity Bits 23-16 | Capacity Units) |
| Data Byte 6 | Capacity Units | 00h = [mWh]<br>01h = [mAh]<br>02h = [10 mWh] |

Table 21 specifies value for the Command and Sub-command fields, Byte Count and Report Status bytes, and data bytes of a "Battery Information" Data Report message (indicated in Tables 1 and 5 above) of the "Battery Manufacturer" type (indicated in Table 6 above).

TABLE 21

Battery Manufacturer Report

| SMB Protocol Byte | Description | Note |
|---|---|---|
| Command Byte | 22h | |
| Byte Count | N = 03h-20h | |
| Data Byte 1 (Sub-Command) | XCh | X = 0h for Battery in Slot 0<br>X = 1h for Battery in Slot 1<br>X = 2h for Battery in Slot 2<br>X = 3h for Battery in Slot 3 |
| Data Byte 2 (Report Status) | 00h | Successful |
| Data Byte 3 - Data Byte N | ASCII string | Manufacturer name is up to 30 characters (may not be null-terminated) |

Table 22 specifies value for the Command and Sub-command fields, Byte Count and Report Status bytes, and data bytes of a "Battery Information" Data Report message (indicated in Tables 1 and 5 above) of the "Battery Model" type (indicated in Table 6 above).

TABLE 22

Battery Model Report

| SMB Protocol Byte | Description | Note |
|---|---|---|
| Command Byte | 22h | |
| Byte Count | N = 03h-20h | |
| Data Byte 1 (Sub-Command) | XDh | X = 0h for Battery in Slot 0<br>X = 1h for Battery in Slot 1<br>X = 2h for Battery in Slot 2<br>X = 3h for Battery in Slot 3 |
| Data Byte 2 (Report Status) | 00h | Successful |
| Data Byte 3- Data Byte N | ASCII string | Battery model is up to 30 characters (may not be null-terminated) |

Table 23 specifies value for the Command and Sub-command fields, Byte Count and Report Status bytes, and data bytes of a "Battery Information" Data Report message (indicated in Tables 1 and 5 above) of the "Battery Type" type (indicated in Table 6 above).

TABLE 23

Battery Type Report

| SMB Protocol Byte | Description | Note |
|---|---|---|
| Command Byte | 22h | |
| Byte Count | N = 03h-20h | |
| Data Byte 1 (Sub-Command) | XEh | X = 0h for Battery in Slot 0<br>X = 1h for Battery in Slot 1<br>X = 2h for Battery in Slot 2<br>X = 3h for Battery in Slot 3 |
| Data Byte 2 (Report Status) | 00h | Successful |
| Data Byte 3- Data Byte N | ASCII string | Battery type (commonly battery chemistry) is up to 30 characters (may not be null-terminated). |

In a class of preferred embodiments, EC/KBC 11 is configured to follow the following behavioral rules for communication with microprocessor 5 over the SMB:

After Power On Reset, EC/KBC 11 is ready to accept PMD request messages over the SMB and respond to them as soon as possible with the following time-out limits:

After an EC Capabilities Request is received, the responsive EC Capabilities Report is sent over the SMB within 25 ms, After a System Status Request is received, the responsive System Status Report is sent over the SMB within 25 ms, After any Battery Information Request is received, the respective Data Report is sent over the SMB within 50 ms, and Action Requests are executed immediately upon receipt.

After Power On Reset, EC/KBC 11 does not initiate any report messages (although it may send report messages in response to requests from microprocessor 5) until a first System Status Report is successfully sent in response to request therefore from microprocessor 5.

After the first System Status Report has been sent, EC/KBC 11 will initiate subsequent System Status Reports by itself whenever any status information changes (e.g., if a battery is connected or removed, or system sleep state changes, etc.). In some implementations, there is an exception to this rule: in the case that GPIO state is changed by EC/KBC 11 in response to a GPIO control action request from microprocessor 5, EC/KBC 11 may not generate a System Status Report.

EC/KBC 11 is configured to handle the case that a new Data Request is received from microprocessor 5 before EC/KBC 11 has sent one or more previously requested Data Reports in response to one or more previous Data Requests. In some implementations, EC/KBC 11 responds with one Data Report to all duplicated Data Requests (with the same command and sub-commands fields).

Figure 3:
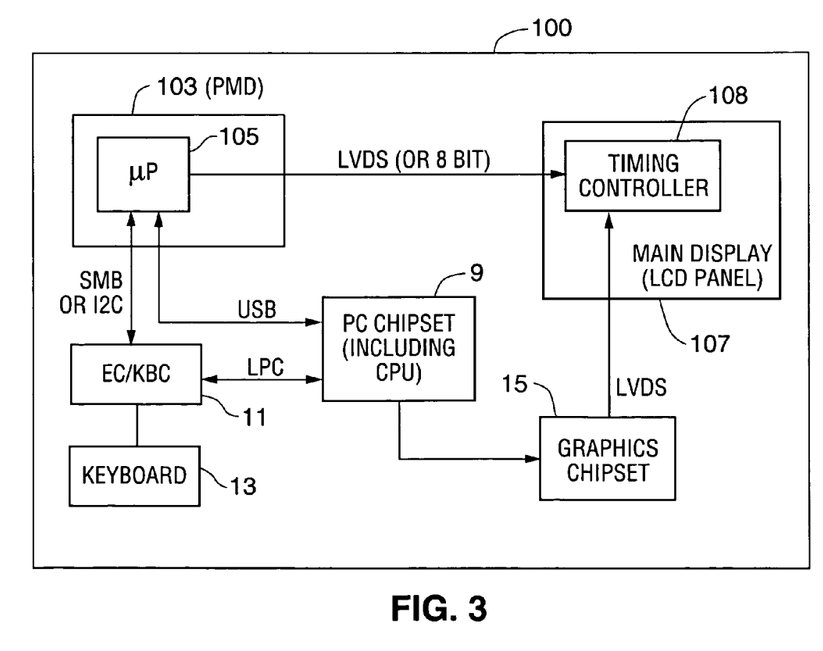
FIG. 3 is another embodiment of the inventive notebook, which includes another embodiment of the inventive auxiliary display subsystem (PMD 103) coupled by an SMB or I2C bus to an embedded controller (EC/KBC 11) of the notebook.

Notebook 100 of FIG. 3 is another embodiment of the inventive notebook which includes another embodiment of the inventive auxiliary display subsystem (PMD 103) coupled by an SMB or I2C bus to an embedded controller (EC/KBC 11) of notebook 100. All elements of FIG. 3 that correspond to identical elements of above-described FIG. 1 are numbered identically in FIGS. 1 and 3, and the description thereof will not be repeated with reference to FIG. 3.

Notebook 100 differs from notebook 1 in that PMD 103 of notebook 100 does not include its own auxiliary display. PMD 103 generates display data of the same type that are displayed on auxiliary display 7 of notebook 1, but sends the display data to main display 107 of notebook 100 (for display on all or part of the screen of display 107). Main display 107 of notebook 100 differs from main display 17 of notebook 1 in that it includes timing controller 108 which is configured to generate display data from raw display data asserted by microprocessor 105 (e.g., by scaling the raw display data and asserting the scaled data with timing for display in a small region of the screen of display 107) and optionally also to combine (multiplex) display data from microprocessor 105 (or a scaled version of such data) with display data from graphics chipset 15 (e.g., so that data from microprocessor 105 or a scaled version thereof can be displayed in a small region of display 107's screen, whether or not display data from graphics chipset 15 is displayed on the rest of display 107's screen).

Preferably, display 107 is an LCD of a type whose pixels (individual backlit liquid crystal cells) can be independently lit (e.g., independently backlit by independently controllable LEDs or other light sources) or display 107 is a display of another type whose pixels can be independently powered and lit. In such preferred embodiments, microprocessor 105 generates display data and asserts the display data (e.g., as 8-bit display data over a parallel link, or as serial data over an LVDS, or "low voltage differential signaling," serial link) for display in only a small region of the screen of display 107, and timing controller 108 asserts the display data to the screen of display 107 with appropriate timing for display in the appropriate small region of display 107's screen. Microprocessor 105 is preferably configured to power only the pixels of display 107's screen in the region in which the display data from PMD 103 are to be displayed, thereby conserving power (e.g., when notebook 100 is in a sleep or other low-power state).

In the case that microprocessor 105 of PMD 103 is coupled by an SMB to EC/KBC 11, microprocessor 105 can be identical to microprocessor 5 of FIG. 1. In this case, messages are preferably sent between microprocessor 105 and EC/KBC 11 in the format described above with reference to Tables 1-23. In the case that microprocessor 105 of PMD 103 is coupled by an I2C bus to EC/KBC 11, messages of the same type described above with reference to Tables 1-23 can be sent between microprocessor 105 and EC/KBC 11 in an appropriate format that will be apparent to those of ordinary skill in the art in view of the description herein.

It should be understood that while some embodiments of the present invention are illustrated and described herein, the invention is defined by the claims and is not to be limited to the specific embodiments described and shown.

What is claimed is:

1. A method for communication in a notebook including a secondary processor coupled to a first serial bus, and an auxiliary display subsystem, the method comprising:

(a) sending at least one message from the auxiliary display subsystem to the secondary processor over the first serial bus, wherein said auxiliary display subsystem comprises an auxiliary processor, and wherein said auxiliary processor is separate from a central processing unit, and wherein said auxiliary processor, said central processing unit and said secondary processor reside within said notebook, and wherein said secondary processor is operable to provide internally originated data to said auxiliary processor when said central processing unit is in a low-power state, and wherein said auxiliary display subsystem is operable to render said internally originated data from said secondary processor when said central processing unit is in said low-power state, and wherein said auxiliary processor is coupled to said central processing unit via a second serial bus, and wherein said auxiliary processor is operable to send a first request over said serial bus and operable to send a second request over said second serial bus; and (b) sending at least one message from the secondary processor to the auxiliary display subsystem over the first serial bus.

2. The method of claim 1, wherein (a) and (b) are performed while the notebook is in a low-power state.

3. The method of claim 1, wherein (a) is performed while the notebook is in a low-power state, and the secondary processor, in response to said at least one message from the auxiliary display subsystem, causes the notebook to boot into a fully-powered normal operating state.

4. The method of claim 1, wherein at least one of the central processing unit and the secondary processor, in response to said at least one message from the auxiliary display subsystem, sends system status data to the auxiliary display subsystem.

5. The method of claim 1, wherein (b) further comprises:
sending system status data from the secondary processor to the auxiliary display subsystem over the first serial bus in response to said at least one message from the auxiliary display subsystem.

6. The method as described in claim 5, wherein said system status data is selected from a group consisting an operating state of said notebook and battery information of said notebook.

7. The method as described in claim 6 wherein said operating state of said notebook is selected from a group comprising of on/off status, shutting down status, standby status, suspended status and hibernation state.

8. The method as described in claim 6, wherein said battery information is selected from a group consisting of charging, discharging, low charge battery level and an alarm indication that said battery level is low.

9. The method of claim 1 further comprising:
sending at least one data request message over the first serial bus from the auxiliary display subsystem to the secondary processor while the notebook is in a low-power state; and
sending at least one report message over the first serial bus from the secondary processor to the auxiliary display subsystem while the notebook is in the low-power state and in response to the at least one data request message.

10. The method of claim 1, wherein the first serial bus is a system management bus (SMB), and wherein said method further comprises:
operating said auxiliary processor as an SMB bus master to send at least one data request message over the SMB to the secondary processor operating as an SMB host controller bus slave while the notebook is in a low-power state; and
operating the secondary processor as an SMB host controller bus master to send at least one report message over the SMB to the auxiliary display subsystem while the notebook is in the low-power state and in response to the at least one data request message.

11. The method of claim 1, wherein the first serial bus is a system management bus (SMB).

12. The method of claim 11, wherein the secondary processor is configured to operate as an SMB host controller, and wherein said method further comprises:
operating said auxiliary processor as an SMB bus master to send at least one data request message to the secondary processor while said secondary processor operates as an SMB host controller bus slave; and
operating the secondary processor as an SMB host controller bus master to send the at least one message to said auxiliary processor operating as an SMB bus slave.

13. The method of claim 11, wherein the secondary processor is configured to operate as an SMB host controller, and wherein said method further comprises:
operating said auxiliary processor as an SMB bus master to send at least one action request message to the secondary processor while said secondary processor operates as an SMB host controller bus slave; and
operating the secondary processor as an SMB host controller bus master to send the at least one message to said auxiliary processor operating as an SMB bus slave.

14. The method of claim 11, wherein the auxiliary processor is configured to send the at least one message in accordance with an SMB host notify protocol, the secondary processor is configured to operate as an SMB host controller, and wherein said method further comprises:
operating the auxiliary processor as an SMB bus master to send the at least one message to the secondary processor in accordance with the SMB host notify protocol while said secondary processor operates as an SMB host controller bus slave.

15. The method of claim 1, wherein the first serial bus is a system management bus (SMB), said second serial bus is a universal serial bus (USB), the auxiliary display subsystem is coupled to the SMB and to the USB, and said method further comprises:
(c) sending data from the notebook over the USB to the auxiliary display subsystem in response to a data request from said auxiliary display subsystem.

16. The method of claim 15, wherein the auxiliary display subsystem includes memory and said method further comprises:
(d) caching in the memory at least some of the data sent to the auxiliary display subsystem over the USB.

17. The method of claim 1, wherein said second serial bus is a universal serial bus (USB), the auxiliary display subsystem is coupled to the first serial bus and the USB, and said method further comprises:
(c) sending data from the notebook over the USB to the auxiliary display subsystem in response to a data request from said auxiliary display subsystem.

18. The method of claim 17, wherein the auxiliary display subsystem includes memory, and said method further comprises:
(d) caching in the memory at least some of the data sent to the auxiliary display subsystem over the USB.

19. The method of claim 1, wherein said second serial bus is a universal serial bus (USB), the auxiliary display subsystem is coupled to the first serial bus and the USB, the central processing unit is coupled to the USB, and wherein said method further comprises:
sending at least one action request from the auxiliary display subsystem while the notebook is in a low-power state to cause the secondary processor to cause the notebook to boot into a fully-powered normal operating state; and
when the notebook is in the fully-powered normal operating state, sending at least one message from the auxiliary display subsystem over the USB to the central processing unit to cause the notebook to perform at least one operation.

20. The method of claim 19 further comprising:
sending at least one data request from the auxiliary display subsystem over the USB to the central processing unit, and sending at least one of audio data, video data, and image data over the USB to the auxiliary display subsystem in response to the at least one data request.

21. The method of claim 1, wherein said notebook further comprises a main display, and wherein said auxiliary display subsystem further comprises an auxiliary display.

22. The method of claim 1, wherein said low-power state comprises said central processing unit being in a standby state.

23. A notebook, comprising:
a first serial bus;
a central processing unit;
a secondary processor coupled to the first serial bus; and
an auxiliary display subsystem coupled to the first serial bus, wherein the auxiliary display subsystem comprises an auxiliary processor, and wherein said auxiliary processor is separate from said central processing unit, and wherein said auxiliary display subsystem is configured to send at least one message to the secondary processor over the first serial bus, and the secondary processor is configured to send at least one message to the auxiliary display subsystem over the first serial bus, and wherein said secondary processor is operable to provide internally originated data to said auxiliary processor when said central processing unit is in a low-power state, and wherein said auxiliary display subsystem is operable to render said internally originated data from said secondary processor when said central processing unit is in said low-power state, and wherein said auxiliary processor is coupled to said central processing unit via a second serial bus, and wherein said auxiliary processor is operable to send a first request over said first serial bus and operable to send a second request over said second serial bus.

24. The notebook of claim 23, wherein the secondary processor is an embedded controller configured to perform keyboard controller functions, and wherein said central processing unit is coupled to the embedded controller.

25. The notebook of claim 23, wherein the auxiliary display subsystem is configured to send the at least one message to the secondary processor over the first serial bus while the notebook is in a low-power state, and the secondary processor is configured to send the at least one message to the auxiliary display subsystem over the first serial bus while the notebook is in the low-power state.

26. The notebook of claim 23, wherein the central processing unit is coupled to the secondary processor, and at least one of the central processing unit and the secondary processor is configured to send system status data to the auxiliary display subsystem in response to at least one said message from the auxiliary display subsystem.

27. The notebook of claim 23, wherein the secondary processor is configured to send system status data to the auxiliary display subsystem in response to at least one said message from the auxiliary display subsystem.

28. The notebook of claim 23, wherein the auxiliary display subsystem is configured to send at least one data request message over the first serial bus to the secondary processor while the notebook is in a low-power state, and the secondary processor is configured to send at least one report message over the first serial bus to the auxiliary display subsystem in response to the at least one data request message while the notebook is in the low-power state.

29. The notebook of claim 23, wherein the first serial bus is a system management bus (SMB), and wherein the auxiliary processor is coupled to the SMB, the auxiliary processor is configured to operate as an SMB bus master to send at least one data request message over the SMB to the secondary processor while said secondary processor operates as an SMB host controller bus slave and the notebook is in a low-power state.

30. The notebook of claim 23, wherein the first serial bus is a system management bus (SMB).

31. The notebook of claim 30, wherein the auxiliary processor is coupled to the SMB, the secondary processor is configured to operate as an SMB host controller, the auxiliary processor is configured to operate as an SMB bus master to send at least one data request message over the SMB to the secondary processor while said secondary processor operates as the SMB host controller bus slave, and the secondary processor is configured to operate as an SMB host controller bus master to send the at least one message to the auxiliary processor while said auxiliary processor operates as an SMB bus slave.

32. The notebook of claim 30, wherein the auxiliary processor is coupled to the SMB, the secondary processor is configured to operate as an SMB host controller, the auxiliary processor is configured to operate as an SMB bus master to send at least one action request message over the SMB to the secondary processor while said secondary processor operates as the SMB host controller bus slave, and the secondary processor is configured to operate as an SMB host controller bus master to send the at least one message to the auxiliary processor while said auxiliary processor of the auxiliary display subsystem operates as an SMB bus slave.

33. The notebook of claim 30, wherein the auxiliary processor is configured to send the at least one message over the SMB in accordance with an SMB host notify protocol, and the secondary processor is configured to operate as an SMB host controller bus slave to receive the at least one message from the auxiliary processor.

34. The notebook of claim 23, wherein the first serial bus is a system management bus (SMB), the second serial bus is a universal serial bus (USB), the auxiliary display subsystem is coupled to the SMB and to the USB, and the auxiliary display subsystem is configured to receive data sent thereto over the USB in response to a data request from said auxiliary display subsystem.

35. The notebook of claim 34, wherein the auxiliary display subsystem includes memory and is configured to cache in the memory at least some of the data sent thereto over the USB.

36. The notebook of claim 23, wherein the second serial bus is a universal serial bus (USB), the auxiliary display subsystem is coupled to the first serial bus and to the USB, and the auxiliary display subsystem is configured to receive data sent thereto over the USB in response to a data request from said auxiliary display subsystem.

37. The notebook of claim 36, wherein the auxiliary display subsystem includes memory and is configured to cache in the memory at least some of the data sent thereto over the USB.

38. The notebook of claim 23 wherein said second serial bus is a universal serial bus (USB), wherein said central processing unit is coupled to said USB, wherein the auxiliary display subsystem is coupled to the first serial bus and to the USB, the auxiliary display subsystem is configured to send at least one action request over the first, serial bus while the notebook is in a low-power state to cause the notebook to boot into a fully-powered normal operating state, and the auxiliary display subsystem is configured to send at least one action request to the central processing unit over the USB when the notebook is in the fully-powered normal operating state to cause the notebook to perform at least one operation.

39. The notebook of claim 38, wherein the auxiliary display subsystem is configured to send at least one data request to the central processing unit over the USB, and the central processing unit is configured to cause at least one of audio data, video data, and image data to be sent over the USB to the auxiliary display subsystem in response to the at least one data request.

40. An auxiliary display subsystem for use in a notebook including a secondary processor coupled to a serial bus and a chipset coupled to a second bus, said auxiliary display subsystem comprising:
    a first interface configured to be coupled to the serial bus;
    a second interface configured to be coupled to the second bus; and
    an auxiliary processor coupled to the first interface and to the second interface, and configured to assert at least one message to the first interface and at least one other message to the second interface, and wherein said secondary processor is further coupled to a central processing unit, and wherein said auxiliary processor, said central processing unit and said secondary processor reside within said notebook, and wherein said secondary processor is operable to provide internally originated data to said auxiliary processor when said central processing unit is in a low-power state, and wherein said auxiliary display subsystem is operable to render said internally originated data from said secondary processor when said central processing unit is in said low-power state, wherein said auxiliary processor is operable to communicate with said central processing unit via said second bus.

41. The auxiliary display subsystem of claim 40, wherein the auxiliary processor is configured to assert at least one data request message to the first interface and to receive at least one report message that is asserted to the first interface in response to the at least one data request message.

42. The auxiliary display subsystem of claim 40, wherein the serial bus is a system management bus (SMB) and the auxiliary processor is configured to operate as an SMB bus master to assert at least one data request message to the first interface.

43. The auxiliary display subsystem of claim 40, wherein the serial bus is a system management bus (SMB) and the auxiliary processor is configured to operate as an SMB bus master to assert at least one action request message to the first interface.

44. The auxiliary display subsystem of claim 40, wherein the serial bus is a system management bus (SMB) and the auxiliary processor is configured to assert the at least one message to the first interface in accordance with an SMB host notify protocol.

45. The auxiliary display subsystem of claim 40, wherein the serial bus is a system management bus (SMB), the second bus is a universal serial bus (USB), and the auxiliary processor is configured to receive data received at the second interface in response to a data request asserted at the first interface.

46. The auxiliary display subsystem of claim 45, wherein the auxiliary display subsystem includes memory and the auxiliary processor is configured to cache in the memory at least some of the data received at the second interface.

47. The auxiliary display subsystem of claim 40, wherein the auxiliary processor is configured to receive data received at the second interface in response to a data request asserted at the first interface.

48. The auxiliary display subsystem of claim 47, wherein the auxiliary display subsystem includes memory and the auxiliary processor is configured to cache in the memory at least some of the data received at the second interface.

49. The auxiliary display subsystem of claim 40, wherein said auxiliary display subsystem is operable to send display data to a main display of said notebook.

* * * * *